United States Patent
Katsuyama

(10) Patent No.: US 9,196,155 B2
(45) Date of Patent: Nov. 24, 2015

(54) REMOTE CONTROL DEVICE, INFORMATION PROCESSING APPARATUS, INFORMATION PROCESSING SYSTEM, AND REMOTE CONTROL METHOD

(71) Applicant: Sony Corporation, Tokyo (JP)

(72) Inventor: Akira Katsuyama, Kanagawa (JP)

(73) Assignee: Sony Corporation (JP)

( * ) Notice: Subject to any disclaimer, the term of this patent is extended or adjusted under 35 U.S.C. 154(b) by 220 days.

(21) Appl. No.: 13/845,791

(22) Filed: Mar. 18, 2013

(65) Prior Publication Data

US 2013/0286293 A1    Oct. 31, 2013

(30) Foreign Application Priority Data

Mar. 29, 2012    (JP) ................. 2012-078195

(51) Int. Cl.
*H04L 17/02* (2006.01)
*G08C 23/04* (2006.01)
*H04L 1/08* (2006.01)

(52) U.S. Cl.
CPC .. *G08C 23/04* (2013.01); *H04L 1/08* (2013.01)

(58) Field of Classification Search
None
See application file for complete search history.

(56) References Cited

U.S. PATENT DOCUMENTS

| | | | | |
|---|---|---|---|---|
| 4,897,718 | A * | 1/1990 | Testin et al. | 348/734 |
| 5,719,637 | A * | 2/1998 | Ohkura et al. | 725/56 |
| 6,509,848 | B1 | 1/2003 | Ogata et al. | |
| 6,607,442 | B2 | 8/2003 | Ogata et al. | |
| 6,717,568 | B1 | 4/2004 | Takatuka et al. | |
| 6,761,635 | B2 * | 7/2004 | Hoshino et al. | 463/39 |
| 2007/0292135 | A1 * | 12/2007 | Guo et al. | 398/106 |
| 2012/0033620 | A1 * | 2/2012 | Thoen et al. | 370/329 |

FOREIGN PATENT DOCUMENTS

JP    2001-320786 A    11/2001

* cited by examiner

*Primary Examiner* — Fekadeselassie Girma
*Assistant Examiner* — John Bamert
(74) *Attorney, Agent, or Firm* — Lerner, David, Littenberg, Krumholz & Mentlik, LLP

(57) ABSTRACT

Provided is a remote control device, including: an operation section configured to receive input of an instruction from a user, and to receive input of an analog value with respect to the instruction; a converting section configured to convert the instruction input in the operation section into a bit string for infrared communication, and to convert the analog value input in the operation section into a bit string for infrared communication; and an infrared-communication section configured to send an infrared signal based on the converted bit strings.

6 Claims, 11 Drawing Sheets

REMOTE CONTROL DEVICE, INFORMATION PROCESSING APPARATUS, INFORMATION PROCESSING SYSTEM, AND REMOTE CONTROL METHOD

CROSS-REFERENCE TO RELATED APPLICATION

The present application claims priority from Japanese Patent Application No. JP 2012-078195 filed in the Japanese Patent Office on Mar. 29, 2012, the entire content of which is incorporated herein by reference.

BACKGROUND

The present disclosure relates to a remote control configured to control a television receiver.

In the past, a user uses a remote control to control a television receiver or a video apparatus. A user sometimes wishes to only turn on/off functions. The user also wishes to control functions, whose process speed may be varied. Such functions include fast-forward/rewind of a video, screen scrolling, and the like.

For example, Japanese Patent Application Laid-open No. 2001-320786 discloses a technology capable of executing multi-level operations with one operation button. Specifically, when a user presses a rewind button lightly, a digital signal of Level 1 or Level 2 is output, and a video player/recorder executes normal-speed rewinding. Further, when a user presses the rewind button slightly stronger, a digital signal of Level 3 is output, and the video player/recorder executes double-speed rewinding. When a user presses the rewind button much stronger, a digital signal of Level 4 is output, and the video player/recorder executes quad-speed rewinding and eightfold-speed rewinding.

SUMMARY

It is necessary for the video player/recorder disclosed in Japanese Patent Application Laid-open No. 2001-320786 to previously set codes, which is sent from a remote control device to the video player/recorder. The previously-set codes correspond to "normal-speed rewinding operation", "double-speed rewinding operation", "quad-speed rewinding operation", and "eightfold-speed rewinding operation", respectively. Further, some video player/recorders only define "normal-speed rewinding operation" and "double-speed rewinding operation". If a "quad-speed rewinding operation" instruction and an "eightfold-speed rewinding operation" instruction are input, such a video player/recorder does not work (stops rewinding). That is, such a video player/recorder is not backward compatible.

In view of the above-mentioned circumstances, it is desirable to provide a remote control device, which is backward compatible and is configured to transmit an analog value in relation to an operation input by a user to an information processing apparatus main body, an information processing apparatus, an information processing system, and a remote control method.

(1) According to an embodiment of the present technology, there is provided a remote control device, including: an operation section configured to receive input of an instruction from a user, and to receive input of an analog value with respect to the instruction; a converting section configured to convert the instruction input in the operation section into a bit string for infrared communication, and to convert the analog value input in the operation section into a bit string for infrared communication; and an infrared-communication section configured to send an infrared signal based on the converted bit strings.

In this configuration, the remote control device is a so-called remote control. When a user operates the operation section arranged on the remote control, an instruction to get an information processing apparatus to work and an analog value with respect to the instruction are given to the remote control. The converting section converts the thus-input instruction into a bit string for infrared communication, and converts the thus-input analog value into a bit string for infrared communication. Then, the infrared-communication section sends the bit strings to a control-target information processing apparatus. In the related art, combination of an instruction and an analog value is replaced with another instruction before sending. According to the present technology, different from the related art, an analog value is sent as it is. Alternatively, an analog value is quantized into about 16 levels, and the quantized value is sent. As a result, the information processing apparatus, which receives an analog value, is capable of executing detailed process corresponding to the received analog value, which is effective. Further, an instruction and an analog value are sent individually. As a result, an existing information processing apparatus, which supports an instruction but does not support an analog value, is capable of working in response to an instruction. In this manner, backward compatibility is realized, which is effective.

(2) In the remote control device according to an embodiment of the present technology, the converting section may be configured to convert the instruction into a bit string having a first bit length, and to convert the analog value into a bit string having a second bit length, the second bit length being different from the first bit length.

According to this configuration, the information processing apparatus, which receives a signal from the remote control device, is capable of determining if the signal includes an instruction or an analog value by only determining the bit length of the received signal, without interpreting an instruction (code) in the signal, which is effective. If the received signal has the first bit length, the received signal may include an instruction. If the received signal has the second bit length, the received signal may include an analog value. If the received signal has other bit length, it is determined that the received signal is a noise. Further, an existing information processing apparatus, which only supports an instruction, receives an analog value having the second bit length. In this case, the existing information processing apparatus is capable of determining that the analog value is a noise only by determining the bit length. That is, the existing information processing apparatus is capable of determining that the analog value is a noise faster than a case of interpreting the signal. In this manner, it is possible to realize backward compatibility easily, which is effective.

(3) Further, in the remote control device according to an embodiment of the present technology, the bit string having the second bit length may include a first bit string and a second bit string, the first bit string indicating the analog value, the second bit string being a complement of the first bit string.

According to this configuration, an error occurs in a first-bit-string portion or a second-bit-string portion in a signal, which is used to send an analog value. In this case, there is no complement relation between the first-bit-string portion and the second-bit-string portion, and the first-bit-string portion is not consistent with the second-bit-string portion. Because of this, it is possible to check an error easily, which is effective.

(4) In the remote control device according to an embodiment of the present technology, the bit strings for infrared communication may include a plurality of bit strings and at least one subsequent bit string, the plurality of bit strings each having the first bit length, the at least one subsequent bit string having the second bit length.

For example, a predetermined infrared communication protocol has a rule in which three signals, which indicate the same instruction, are sent. According to this configuration, in this case, one signal, which indicates an analog value, is sent as the fourth signal. According to this configuration, an existing information processing apparatus, which only supports a signal indicating an instruction but does not support a signal indicating an analog value, receives the three same instructions according to the rule. Because of this, the existing information processing apparatus is capable of receiving the instruction. In addition, since there is only one signal indicating an analog value, the existing information processing apparatus is capable of processing the signal indicating an analog value as a noise easily, which is effective.

(5) The remote control device according to an embodiment of the present technology may further include a controller section configured to determine, in a case where it is determined that a key is being pressed, if the key is a pressure sensitive key.

According to this configuration, the controller section confirms that the pressed key is a pressure sensitive key. After that, an analog value is sent. Because of this, in a case where the pressed key is not a pressure sensitive key, it is possible to avoid a needless process, which is effective.

(6) According to an embodiment of the present technology, there is provided an information processing apparatus, including: an infrared receiving section configured to receive an infrared signal sent from a remote control device, the remote control device including an operation section configured to receive input of an instruction from a user, and to receive input of an analog value with respect to the instruction, the remote control device being configured to convert the instruction input in the operation section into a bit string for infrared communication, and the analog value input in the operation section into a bit string for infrared communication, the remote control device being configured to send an infrared signal based on the converted bit strings; and a controller section configured to decode the received infrared signal to obtain the bit strings, to determine the instruction input by the user and the analog value, and to execute the instruction based on the analog value.

(7) According to an embodiment of the present technology, there is provided an information processing system, including: a remote control device including an operation section configured to receive input of an instruction from a user, and to receive input of an analog value with respect to the instruction, a converting section configured to convert the instruction input in the operation section into a bit string for infrared communication, and to convert the analog value input in the operation section into a bit string for infrared communication, and an infrared-communication section configured to send an infrared signal based on the converted bit strings; and an information processing apparatus including an infrared receiving section configured to receive an infrared signal sent from the remote control device, and a controller section configured to decode the received infrared signal to obtain the bit strings, to determine the instruction input by the user and the analog value, and to execute the instruction based on the analog value.

(8) According to an embodiment of the present technology, there is provided a remote control method, including: receiving, by an operation section, input of an instruction from a user and input of an analog value with respect to the instruction; converting, by a converting section, the instruction input in the operation section into a bit string for infrared communication, and the analog value input in the operation section into a bit string for infrared communication; and sending, by an infrared-communication section, an infrared signal based on the converted bit string.

As described above, according to the present technology, the backward-compatible remote control device is capable of transmitting an analog value in relation to an operation input by a user to an information processing apparatus main body. In addition, the information processing apparatus is capable of obtaining information of an analog value simultaneously with an instruction from the remote control device, and of executing process.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.

First Embodiment

[Gist of the Present Technology]

The present technology devises a scheme in which an analog value (e.g., pressure applied to key of remote control) is added to data sent from a remote control to a main body. For example, a jog dial or the like generates an analog value. Further, a user may tap or hold down a cursor key. If a user wishes to adjust the cursor speed to move the cursor slowly or swiftly, the user holds down a cursor key. If an analog value is input, it is possible to adjust the cursor speed. The simplest usage of a remote control, which supports variable pressure, is to make cursor-moving speed variable depending on pressure applied to a key.

For example, such a remote control may be used for a video apparatus as follows. That is, when a user presses a fast-forward button lightly, data is fast forwarded a little. When a user presses a fast-forward button stronger, fast-forward speed is further increased.

A code is sent when an up/down/right/left cursor key or the like on a remote control is pressed or when a jog dial on a remote control is wheeled. It is a gist of the present technology to make such a code backward compatible. That is, the remote control is capable of controlling an existing apparatus, which does not support variable speed, appropriately. Further, the remote control is capable of specifying variable speed to an apparatus, which supports variable speed. Note that it is another gist of the present technology to attain versatility (in principle, capable of adding weight frame to all the existing codes). It is another gist of the present technology not to lose effectiveness of a remote control even if data is superimposed. It is another gist of the present technology to be capable of receiving, by a receiving side, a weight frame by means of a simple receiving algorithm.

[Example in Case where Backward-Incompatible Code System is Used (Apparatus does not Operate)]

In general, weight data is sent via infrared as follows in the past. That is, when a button is pressed lightly, a code of a format "A" is sent. When the button is pressed slightly stronger, the code is changed, and a code "B" is sent for a predetermined time period. The code "B" corresponds to speed faster than the code of the format "A". That is, in the past, a code has a definition of a normal-speed fast-forward code, another code has a definition of a double-speed fast-forward code, and another code has a definition of a triple-speed fast-forward code. A code is selected based on pressure. However, for example, the code system is used for an apparatus for which a double-speed code "B" is not defined. In this case, the apparatus is controlled appropriately when the apparatus receives a normal-speed fast-forward code "A". However, at a time when the apparatus receives the double-speed code "B", the apparatus stops.

[How to Insert Data]

Figure 1A:
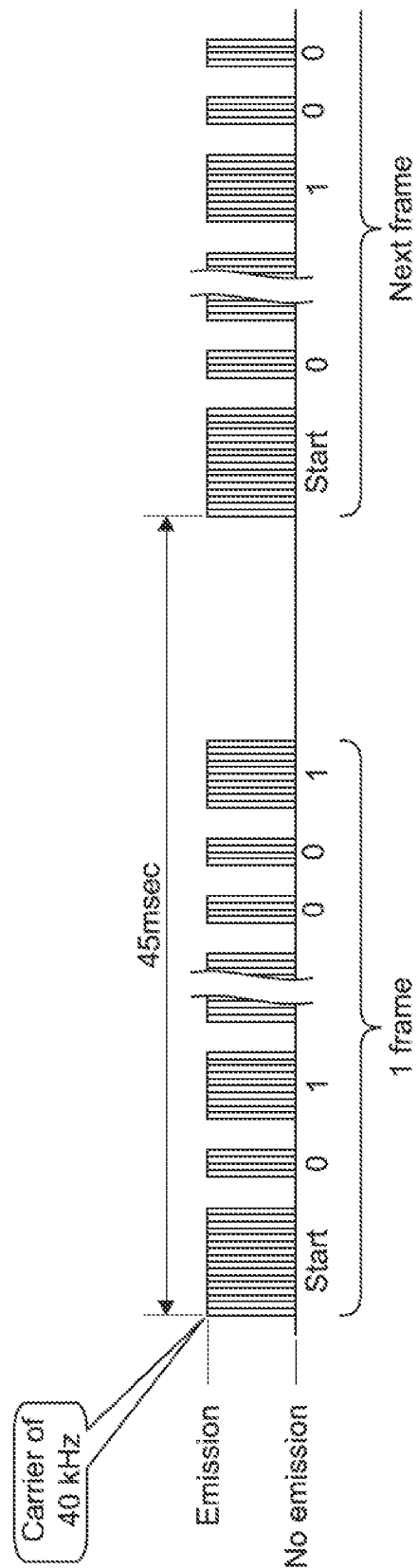
FIG. 1A is a diagram for explaining a frame in SIRCS protocol.

As shown in FIG. 1A, according to SIRCS (SONY (registered trademark) IR Control System) protocol, in general, an IR (infrared) signal includes a start bit and subsequent repeating 0 and 1 bits. The start bit and the 0 and 1 bits constitute one frame. A frame is repeatedly sent at intervals of 45 ms. It is possible to send data of about 20 bits in one frame. In the past, 12 bits, 15 bits, and 20 bits are employed as the number of bits. Each of the start bit and the 0 and 1 bits includes a carrier of 40 kHz (emission and non-emission are repeated).

Note that infrared light for infrared communication is vulnerable to other light and electrostatic force. So a signal is likely to include a noise. As a result, there is a possibility that 1 bit is misread as 0 bit. In view of this, SIRCS employs an algorithm called twice matching. According to this algorithm, a sending side sends three or more frames, which are the same. A receiving side determines that a code is effective only after the receiving side receives the same code twice.

Note that, recently, according to some formats, one frame includes parity. In this case, it is possible to confirm if there is an error by reading one frame. However, in the existing method, the following decoding method is employed. That is, one frame of data does not include parity. The number of bits is always confirmed. It is confirmed if frames, which include the same 0 and 1 bits, are received twice continuously.

In a case where only one weight frame of this embodiment is added, the above-mentioned error-check method called twice matching is not used. In this case, the frame is data likely to be corrupted as it is, and an error in the frame may not be checked. In view of this, according to the format of the weight frame, a "category" bit portion is not distinguished from a "data" bit portion, similar to other frames. In the defined 10 bits, the first 2 bits are used to specify a format. The next 4 bits are used for analog data. The last 4 bits are used for a complement of the analog data. By confirming consistency between the data and the complement of the data, occurrence of an error is prevented.

That is, according to the remote control of this embodiment, a frame (signal) for sending an analog value includes a first bit string and a second bit string. The first bit string indicates the analog value. The second bit string is a complement of the first bit string.

An existing frame is 12 bits, 15 bits, or 20 bits. So if a weight frame is 10 bit, the weight frame is distinguished from the existing frame based on the difference of bit length. Further, an apparatus, which do not support a weight frame, does not define the 10-bit frame. So the apparatus ignores the weight frame and treats the weight frame merely as a noise. Because of this, the weight frame is backward compatible.

That is, according to the remote control of this embodiment, a microcontroller (converting section) converts a code (instruction) into a bit string (existing frame) having a first bit length. The microcontroller (converting section) converts an analog value into a bit string (weight frame) having a second bit length. The second bit length is different from the first bit length. The microcontroller (converting section) sends the bit string (existing frame) and the bit string (weight frame).

Further, one weight frame is sent after three existing frames are sent. From the viewpoint of checking twice matching, an apparatus, which do not support a weight frame, ignores the weight frame and treats the weight frame merely as a noise. Because of this, the weight frame is backward compatible.

That is, according to the remote control (infrared-communication section) of this embodiment, bit strings for infrared communication include a plurality of bit strings (existing frames) and at least one subsequent bit string (weight frame). The bit string (existing frame) has the first bit length. The bit string (weight frame) has the second bit length.

Note that the weight frame does not have a portion corresponding to "category". This is because the weight frame is treated as modification data with respect to a code being received. That is, a single weight frame has no meaning. Only if there is a code being received, 10 bit data of the weight frame is effective. In other words, a weight frame may be effective with respect to all the "categories" and "data" currently defined. It is not necessary to newly define "category" or "data" in order to use a weight frame. This is the best feature of the present technology.

According to SIRCS, even if a key is pressed momentarily, three frames of continuous command are always sent. So a weight frame is sent as the subsequent fourth frame. This is because SIRCS has the twice matching rule. In a case of using a weight frame under another protocol, the weight frame may be sent in accordance with this protocol.

Basically, a weight frame uses bit length, which is not used conventionally. Further, a weight frame is modification data with respect to a code being received. The weight frame only has to have a structure, which enables error check with one frame. A format only including analog modification data such as pressure may be employed for each remote-control system.

[Structure of Weight Frame]

A weight frame is structured as a 10-bit frame subsequent to a start bit. 2 bits subsequent to the start bit shows the format of the weight frame. The next 4 bits shows analog data. The last 4 bits shows a complement of the analog data. Currently, as the 2 bits showing the format of the weight frame, "00" defines that analog data portion indicates weight data. "01", "10", and "11" are not defined currently. For example, "01" out of them may be defined to indicate data of rotation speed of a jog dial.

Note that the analog data portion has 4 bits. So the analog data portion is capable of expressing 16-level values. Because of this, it is possible to express an analog value more linearly than an existing case of defining codes, which express several steps of levels.

[Timing to Send Weight Frame]

Figure 1B:
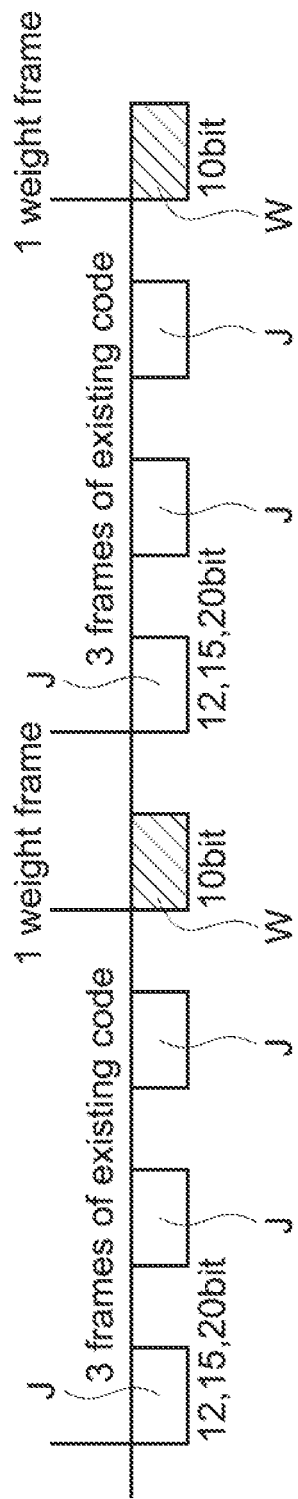
FIG. 1B is a diagram showing timing to send a weight frame W according to an embodiment.

FIG. 1B shows timing to send the weight frame W by the remote control. After three existing frames J are sent, one weight frame W is inserted and sent. The cycle of sending the existing frames J and the weight frame W is 45 ms. So the weight frame W including analog data (key pressure, dial rotation amount, etc.) is sent every four frames, i.e., every 180 ms.

[Cancel Timer]

According to SIRCS, one frame is sent within 45 ms. It is determined if two frames are continuously received as follows. A timer of 100 ms is provided. If a frame is not read within the time of the timer, it is determined that a frame is not received. If a signal of a second frame is read, the timer is reset. The timer-reset behavior is repeated during signals are read. As a result, it is determined that the frames are continuously sent. Even if one unreadable frame is inserted, the remote-control scheme does not stop the behavior.

[Application (Jog Dial)]

Figure 2:
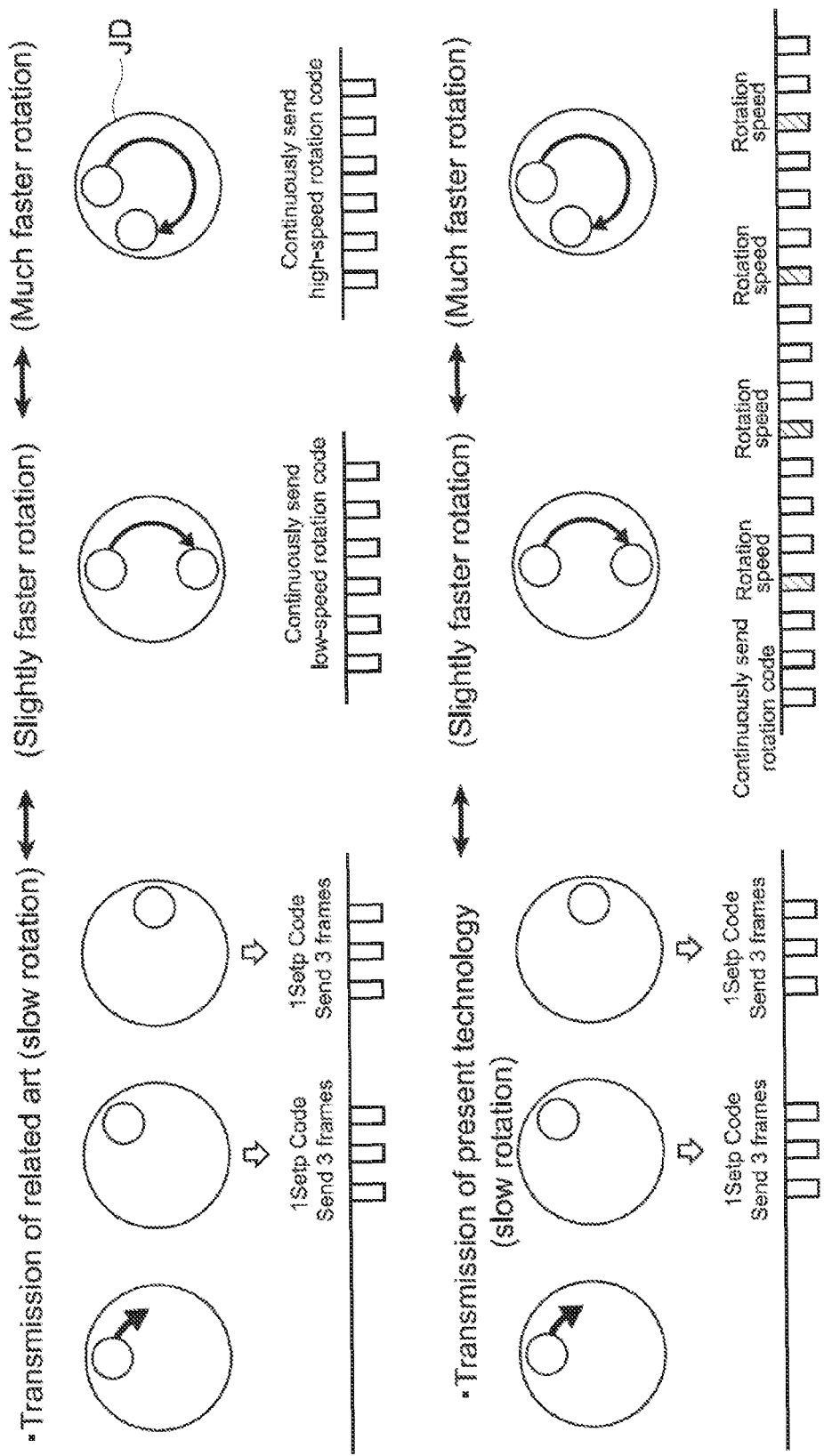
FIG. 2 is a diagram showing an example in which a related art is applied to a jog dial JD and an example in which this embodiment is applied to the jog dial JD.

FIG. 2 shows an example of a jog dial JD as an example in which an analog value other than pressure is used. The upper part shows an example of the related art. First, an example of the related art will be described.

The left side shows a case where a user turns the jog dial JD slowly. Every time the user turns the jog dial JD, three frames of codes, which indicate rotation of the jog dial JD, are sent. The adjacent right side shows a case where a user turns the jog dial JD slightly faster. In this case, codes, which indicate low-speed rotation, are alternatively sent continuously. Then, the right end shows a state where a user turns the jog dial JD much faster. In this case, codes, which indicate high-speed rotation, are sent continuously.

The number of levels specifying rotation speed is about three levels. It is difficult to specify rotation speed linearly. Further, codes are only changed about every 0.5 seconds to every 1 second.

The lower part of FIG. 2 shows a state of this embodiment. The left side is similar to the related art. The left side shows a case where a user turns the jog dial JD slowly. Every time the user turns the jog dial JD, three frames of codes, which indicate rotation of the jog dial JD, are sent. The adjacent right side shows a case where a user turns the jog dial JD slightly faster. In this case, three frames of codes, which indicate rotation of the jog dial JD, are sent. After that, one weight frame W of analog data, which indicates rotation speed (rotation amount), is sent. The right end shows a state where a user turns the jog dial JD much faster. Also in this state, three frames of codes, which indicate rotation of the jog dial JD, are sent similar to the above. Subsequently, one frame of analog data, which indicates rotation speed, is sent. In the analog data, the value, which indicates rotation speed, indicates speed faster than the previous value.

The number of levels, which specify rotation speed, is 16. Because of this, it is possible to specify rotation speed more linearly. Further, analog data is sent every 180 ms. Because of this, the remote control is capable of sending an operation status of the jog dial JD more accurately.

Note that the number of rotation (number of clicks) of the jog dial JD within 180 ms is used as rotation speed. 180 ms is a period between the time at which analog data is sent previously and the time at which analog data is sent most recently. If this period includes 16 clicks of rotation, it means that a user turns the jog dial JD at good speed.

[Block Diagram of Remote Control 10]

A remote control device (remote control device) according to this embodiment includes: a key (operation section) configured to receive input of a code (instruction) from a user, and to receive input of an analog value with respect to the code (instruction); a microcontroller (converting section, controller section) configured to convert the code (instruction) input in the key (operation section) into a bit string for infrared communication, and to convert the analog value input in the key (operation section) into a bit string for infrared communication; and an infrared light-emitting section (infrared-communication section) configured to send an infrared signal based on the converted bit strings.

Figure 3A:
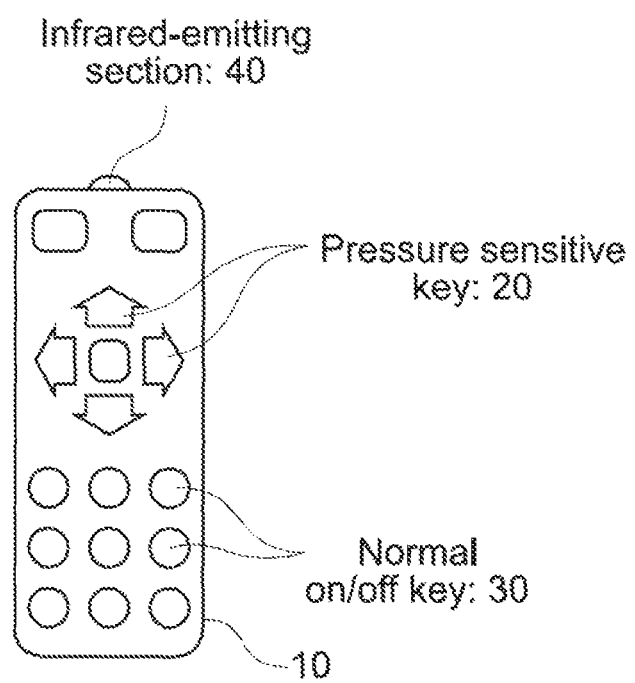
FIG. 3A is an external view showing a remote control of this embodiment.

FIG. 3A is an external view showing a remote control 10 of this embodiment. The remote control 10 includes pressure sensitive keys 20 (operation section), normal on/off keys 30, and an infrared emitting section 40 (infrared-communication section). In a case where a user operates the pressure sensitive key 20, pressure is detected. Meanwhile, in a case where a user operates the normal on/off key 30, a normal on/off operation is only detected.

Figure 3B:
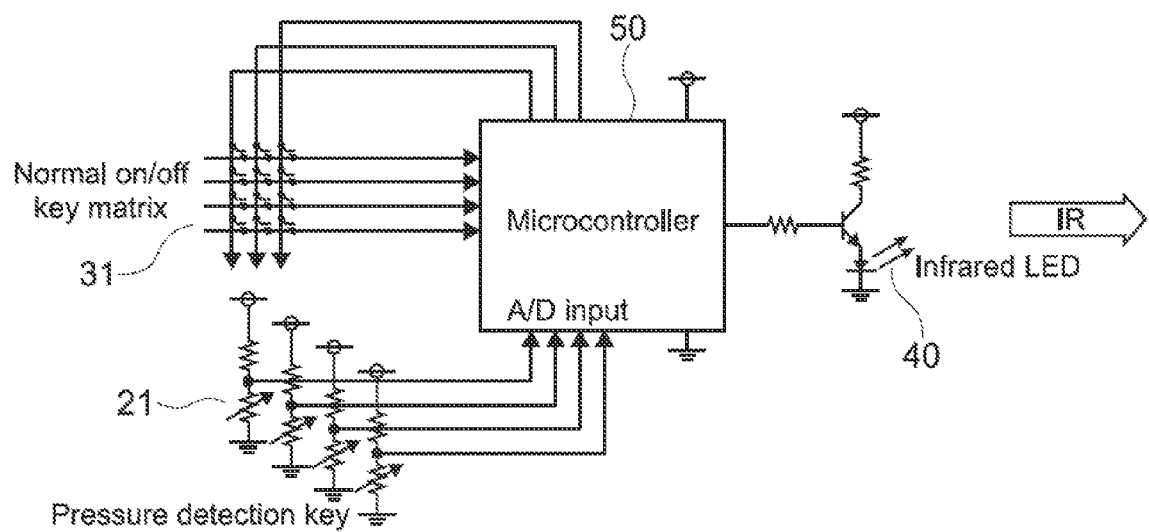
FIG. 3B is a block diagram showing a configuration of the remote control of this embodiment.

FIG. 3B is a block diagram showing the remote control 10. A normal on/off key matrix 31 is one in a general remote control. Pressure detection keys 21 are provided for the pressure sensitive keys 20. A device, which is configured to generate different resistance values depending on pressure applied to the keys by a user, may be used as the pressure detection keys 21. In FIG. 3B, the remote control 10 includes the four pressure detection keys 21. It means that the pressure detection keys 21 correspond to the pressure sensitive keys 20 (up/down/right/left cursor keys) of FIG. 3A, respectively.

The pressure detection keys 21 are connected to A/D input terminals of a microcontroller 50, respectively. When the pressure detection key 21 is pressed, the microcontroller 50 adjusts the format of a weight frame W. After that, the microcontroller 50 sends the weight frame W by means of the infrared emitting section 40 connected to the microcontroller 50.

Note that it is supposed that the remote control (remote control device) of this embodiment and a television receiver (information processing apparatus) of this embodiment are used in combination as a television receiver system (information processing system). That is, a television receiver system (information processing system) of this embodiment includes: a remote control (remote control device) device including a key (operation section) configured to receive input of a code (instruction) from a user, and to receive input of an analog value with respect to the code (instruction), a microcontroller (converting section) configured to convert the code (instruction) input in the key (operation section) into a bit string for infrared communication, and to convert the analog value input in the key (operation section) into a bit string for infrared communication, and an infrared light-emitting section (infrared-communication section) configured to send an infrared signal based on the converted bit strings; and a television receiver (information processing apparatus)

including a main controller (infrared receiving section) configured to receive an infrared signal sent from a remote control (remote control device), the remote control device including a key (operation section) configured to receive input of a code (instruction) from a user, and to receive input of an analog value with respect to the code (instruction), the remote control device being configured to convert the code (instruction) input in the key (operation section) into a bit string for infrared communication, and the analog value input in the key (operation section) into a bit string for infrared communication, the remote control device being configured to send an infrared signal based on the converted bit strings, and a main controller (controller section) configured to decode the received infrared signal to obtain the bit strings, to determine the code (instruction) input by the user and the analog value, and to execute the code (instruction) based on the analog value.

Note that, as described above, even if an existing television receiver does not support a weight frame, if the television receiver supports the existing frame, the television receiver is backward compatible. So it is possible to use the existing television receiver.

[Hardware Configuration of Operation-Target Apparatus]

Figure 4:
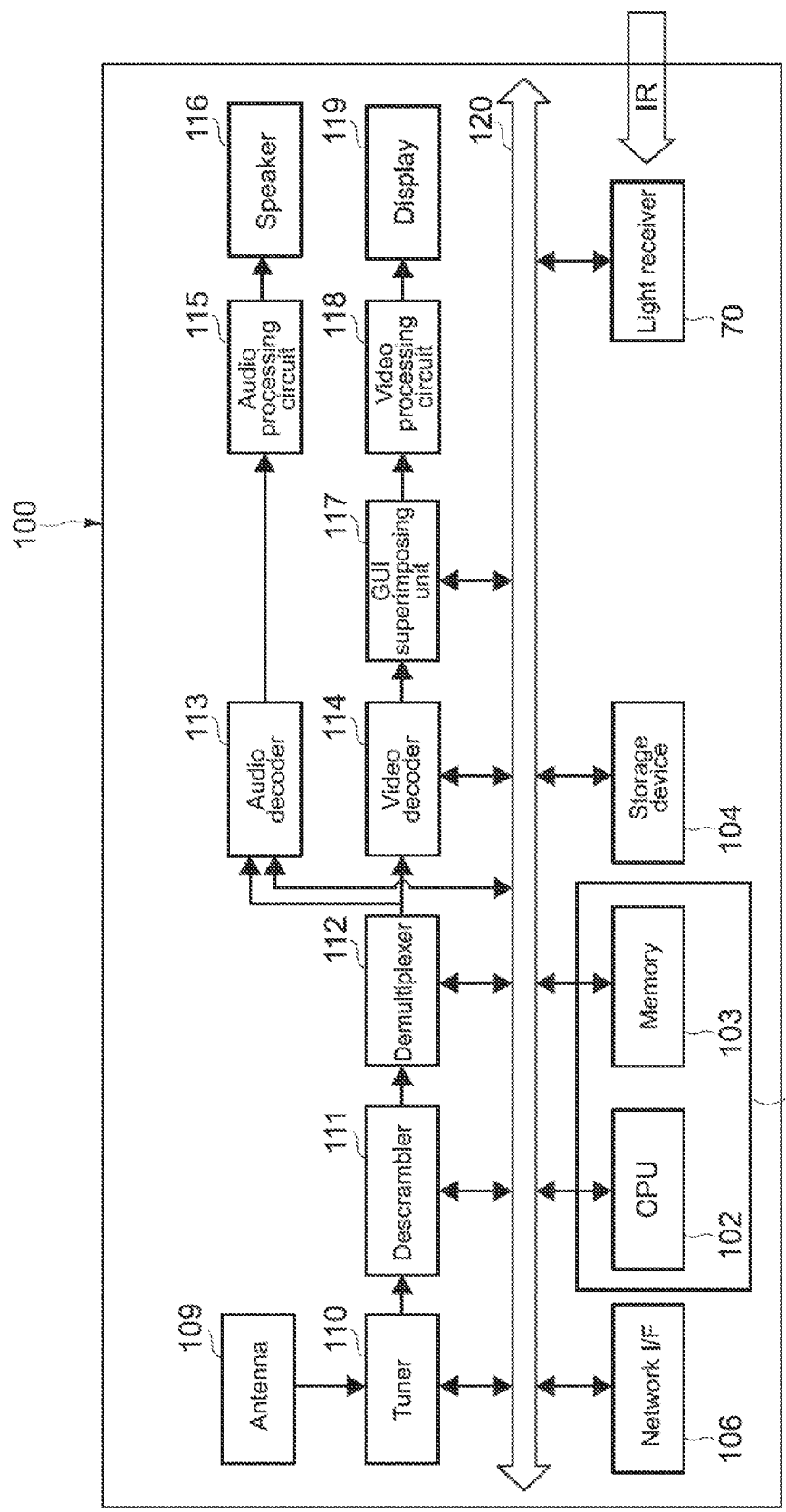
FIG. 4 is a block diagram showing the hardware configuration of an operation-target apparatus.

FIG. 4 is a block diagram showing the hardware configuration of an operation-target apparatus 100.

In this embodiment, the operation-target apparatus 100 is a television receiver. The operation-target apparatus of the present technology may not be a television receiver. For example, the operation-target apparatus may be a personal computer, a game machine, a picture recorder, a picture reproducer, or the like.

The operation-target apparatus 100 includes a main controller 101 (including a CPU 102 and a memory 103), a bus 120, a storage device 104, a light receiver 70, and a network I/F 106. The operation-target apparatus 100 further includes an antenna 109, a tuner 110, a descrambler 111, a demultiplexer 112, an audio decoder 113, a video decoder 114, an audio processing circuit 115, a speaker 116, a GUI (Graphical User Interface) superimposing unit 117, a video processing circuit 118, and a display 119.

In the operation-target apparatus 100, the CPU 102 executes various kinds of processes according to programs stored in the memory 103 and the storage device 104 connected via the bus 120. Further, the CPU 102 receives, as commands, infrared signals input from the remote control 10 via the light receiver 70. The CPU 102 controls operations of the respective units based on the commands.

The light receiver 70 communicates with the remote control 10 one-way by means of infrared signals.

The antenna 109 receives digital broadcast signals and the like, and inputs the signals in the tuner 110.

The tuner 110 extracts a broadcast signal of a predetermined channel (for example, channel designated by the remote control 10 through a user operation) from digital broadcast signals. The tuner 110 performs a demodulation process on the extracted broadcast signal to thereby obtain a transport stream of the predetermined channel, and outputs the transport stream to the descrambler 111.

The descrambler 111 descrambles the transport stream input from the tuner 110 by using a predetermined descrambler key. The descrambler 111 outputs the descrambled transport stream to the demultiplexer 112.

The demultiplexer 112 demultiplexes audio data and video data from the descrambled transport stream input from the descrambler 111. The demultiplexer 112 outputs the demultiplexed audio data to the audio decoder 113, and outputs the demultiplexed video data to the video decoder 114.

The audio decoder 113 decodes the audio data input from the demultiplexer 112, and outputs the obtained electric signal to the audio processing circuit 115.

The audio processing circuit 115 performs a D/A (Digital/Analog) converting process, an amplification process, and the like on the audio data input from the audio decoder 113. The audio processing circuit 115 outputs the obtained audio signal to the speaker 116.

The video decoder 114 decodes the video data input from the demultiplexer 112, and outputs the obtained video data to the GUI superimposing unit 117.

The GUI superimposing unit 117 superimposes graphic data such as OSD (On Screen Display) on the video data input from the video decoder 114, and outputs the video data to the video processing circuit 118.

The video processing circuit 118 performs a predetermined image process, a D/A (Digital/Analog) converting process, and the like on the video data input from the GUI superimposing unit 117, and output the obtained video signal to the display 119.

Further, similar to the above, operated by the remote control 10, the CPU 102 receives digital broadcast signals, obtains a transport stream of a predetermined channel, and stores the transport stream in the storage device 104 as video/audio data of a broadcast program.

A television receiver (information processing apparatus) according to this embodiment includes: a light receiver and a main controller (infrared receiving section) configured to receive an infrared signal sent from a remote control (remote control device), the remote control (remote control device) including a key (operation section) configured to receive input of a code (instruction) from a user, and to receive input of an analog value with respect to the code (instruction), the remote control device being configured to convert the code (instruction) input in the key (operation section) into a bit string for infrared communication, and the analog value input in the operation section into a bit string for infrared communication, the remote control device being configured to send an infrared signal based on the converted bit strings; and a main controller (controller section) configured to decode the received infrared signal to obtain the bit strings, to determine the code (instruction) input by the user and the analog value, and to execute the code (instruction) based on the analog value.

FIG. 4 does not show characteristics of this embodiment. That is, the light receiver 70 merely receives the weight frame W, and the main controller 101 merely executes processes corresponding to the weight frame W. Examples of the processes corresponding to the weight frame W include the following processes. First, the main controller 101 receives the weight frame W accurately. Then, the main controller 101 executes processes corresponding to analog data in the received weight frame W. Examples of the processes corresponding to analog data include variable-speed screen scrolling, variable-speed motion-picture reproduction, and the like.

A process flow of the processes corresponding to the weight frame W executed by the main controller 101 will be described later.

[Flow of Sending Process Executed by Remote Control 10 (Related Art)]

Figure 5:
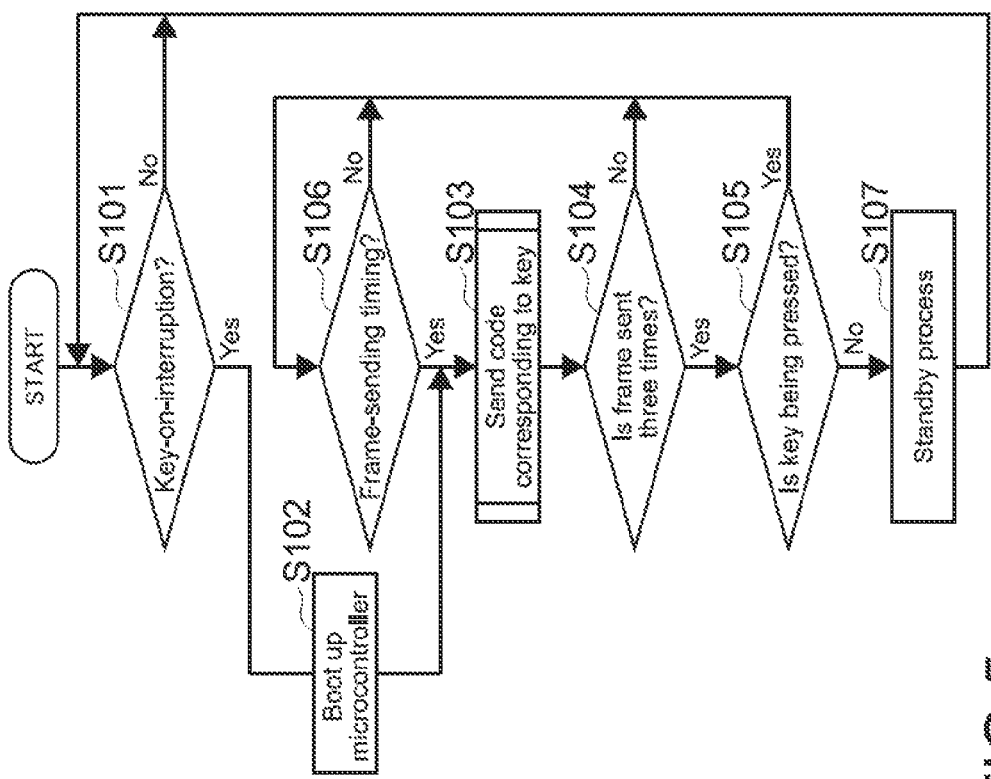
FIG. 5 is a flowchart showing a flow in a case where a remote control of the related art sends a code.

FIG. 5 shows an example of an existing process flow in a case where the remote control 10 sends a code.

First, the remote control 10 detects a key-on-interruption. (Step 101, hereinafter "Step" is simply referred to as "S" such as "S101".)

The remote control 10 is usually in a standby status. When any key is pressed, an interruption occurs. Then, the microcontroller 50 in the standby status returns to a normal operation mode. So the remote control 10 first determines a key-on-interruption. In a case where a key-on-interruption occurs, the microcontroller 50 executes the next process (S102). In a case where a key-on-interruption does not occur, the microcontroller 50 returns to "start".

If the remote control 10 determines that a key-on-interruption occurs in S101, the microcontroller 50 in a sleep status returns to a normal operation mode (microcontroller 50 boots up). (S102)

In S102, the microcontroller 50 boots up. Alternatively, in S106, frame-sending timing is determined. In these cases, next, the microcontroller 50 sends a code corresponding to a pressed key. (S103)

In S103, the booted-up microcontroller 50 scans keys to thereby detect a pressed key. The booted-up microcontroller 50 stores a code corresponding to the pressed key in a frame J. The infrared emitting section 40 sends the frame J.

Next, the microcontroller 50 determines if the infrared emitting section 40 sent the frame J three times. (S104)

According to SIRCS protocol, the frame J including the same code is sent three times. So, if the frame J is not sent three times, the microcontroller 50 sends the same frame J again in S106. If the frame J is sent three times, the microcontroller 50 proceeds to S105.

If it is determined that the frame J is sent three times in S104, next, the microcontroller 50 determines if the key is being pressed. (S105)

If the key is still being pressed after the frame is sent three times, the microcontroller 50 sends the frame once again in S106. If the key is not being pressed, the microcontroller 50 establishes the standby status in S107.

In S104, it is determined that the frames are not sent three times. Alternatively, in S105, it is determined that the key is being pressed. Alternatively, in S106, it is determined that it is not frame-sending timing. In these cases, next, the microcontroller 50 determines if it is frame-sending timing. (S106)

Timing for sending the frame J is every 45 ms. So a timer counts to 45 ms from the start of sending the previous frame. The microcontroller 50 waits for 45 ms and sends the next frame. Note that a timer may count to 45 ms. Instead of a timer, a lapse of 45 ms may be determined based on estimated time for an execution path of each software process.

If it is determined that the key is not being pressed in S105, the microcontroller 50 establishes the standby status. (S107)

[Flow of Sending Process Executed by Remote Control 10 (the Present Technology)]

To put it shortly, a flow of sending process executed by a remote control according to this embodiment includes: receiving, by a key (operation section), input of a code (instruction) from a user and input of an analog value with respect to the code (instruction); converting, by a microcontroller (converting section), the code (instruction) input in the key (operation section) into a bit string for infrared communication, and the analog value input in the operation section into a bit string for infrared communication; and sending, by a microcontroller and an infrared light-emitting section (infrared-communication section), an infrared signal based on the converted bit string.

Figure 6:
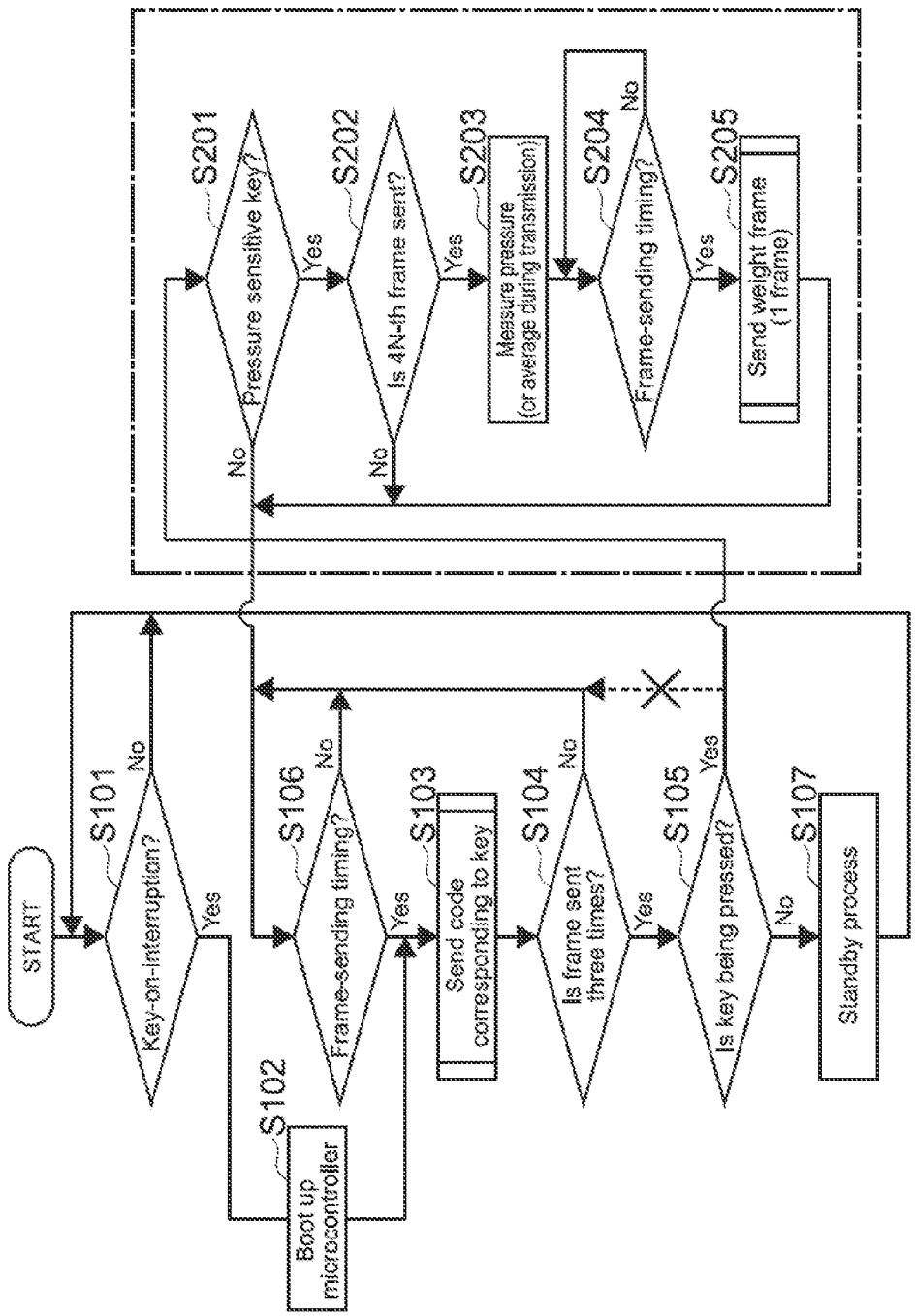
FIG. 6 is a flowchart showing a flow in a case where the remote control of this embodiment sends a code.

FIG. 6 shows a process flow in a case where the remote control 10 sends a code according to this embodiment. Note that, S101 to S107 of this embodiment is same as S101 to S107 of the related art. Both in this embodiment and in the related art, when a key is pressed, the frame J including a code corresponding to the pressed key is sent three times. Further, both in this embodiment and in the related art, in a case where a key is not being pressed after the frame is sent three times, the microcontroller 50 establishes a standby status. So those processes will not be described.

If it is determined that a key is being pressed in S105, next, the microcontroller 50 determines if the pressed key is the pressure sensitive key 20. (S201)

If the pressed key is not the pressure sensitive key 20, the microcontroller 50 returns to the process of S106. If the pressed key is the pressure sensitive key 20, the microcontroller 50 proceeds to the process of S202. Examples of the pressure sensitive keys 20 include up/down/right/left cursor keys, a jog dial, and the like.

If it is determined that the pressed key is the pressure sensitive key 20 in S201, next, the microcontroller 50 determines if a frame including a code corresponding to the pressed key is sent three times continuously. In other words, the microcontroller 50 determines if a fourth frame (4N-th) is sent. (S202)

As described above, it is determined if a frame is sent three times continuously. The reason is as follows. That is, the weight frame W should be sent as the fourth frame. In a case where the same pressure sensitive key 20 is continuously pressed, the weight frame W is inserted as a 4N-th frame (i.e., fourth frame, eighth frame, or twelfth frame).

If a frame including a code corresponding to the pressed key is not yet sent three times continuously, the microcontroller 50 sends the frame J including the code corresponding to the pressed key in S106. If the frame is sent three times, the microcontroller 50 proceeds to the process of S203.

If it is determined that a code corresponding to the pressed key is sent three times continuously in S202, next, the microcontroller 50 measures pressure applied to the key. (S203)

The microcontroller 50 may measure pressure after the process of S203 is executed. Alternatively, pressure may be periodically measured previously, and the average (average during transmission) of the measured values may be a measured value. Alternatively, in a case of a jog dial, the number of clicks, which occur along with rotation of the dial, may be counted, and the counted number may be used as a measured value.

The process of S203 is finished. Alternatively, in S204, it is determined that it is not frame-sending timing. In these cases, next, the microcontroller 50 determines if it is frame-sending timing. (S204)

If it is determined that it is not frame-sending timing, the microcontroller 50 waits for sending timing in S204. If it is determined that it is frame-sending timing, the microcontroller 50 proceeds to the process of S205.

If it is determined that it is frame-sending timing in S204, the microcontroller 50 sends the weight frame W (pressure data). (S205)

After sending the weight frame W, the microcontroller 50 sends a code corresponding to the pressed key in S106.

[Flow of Receiving Process Executed by Operation-Target Apparatus 100 (Example of General Process)]

Figure 7:
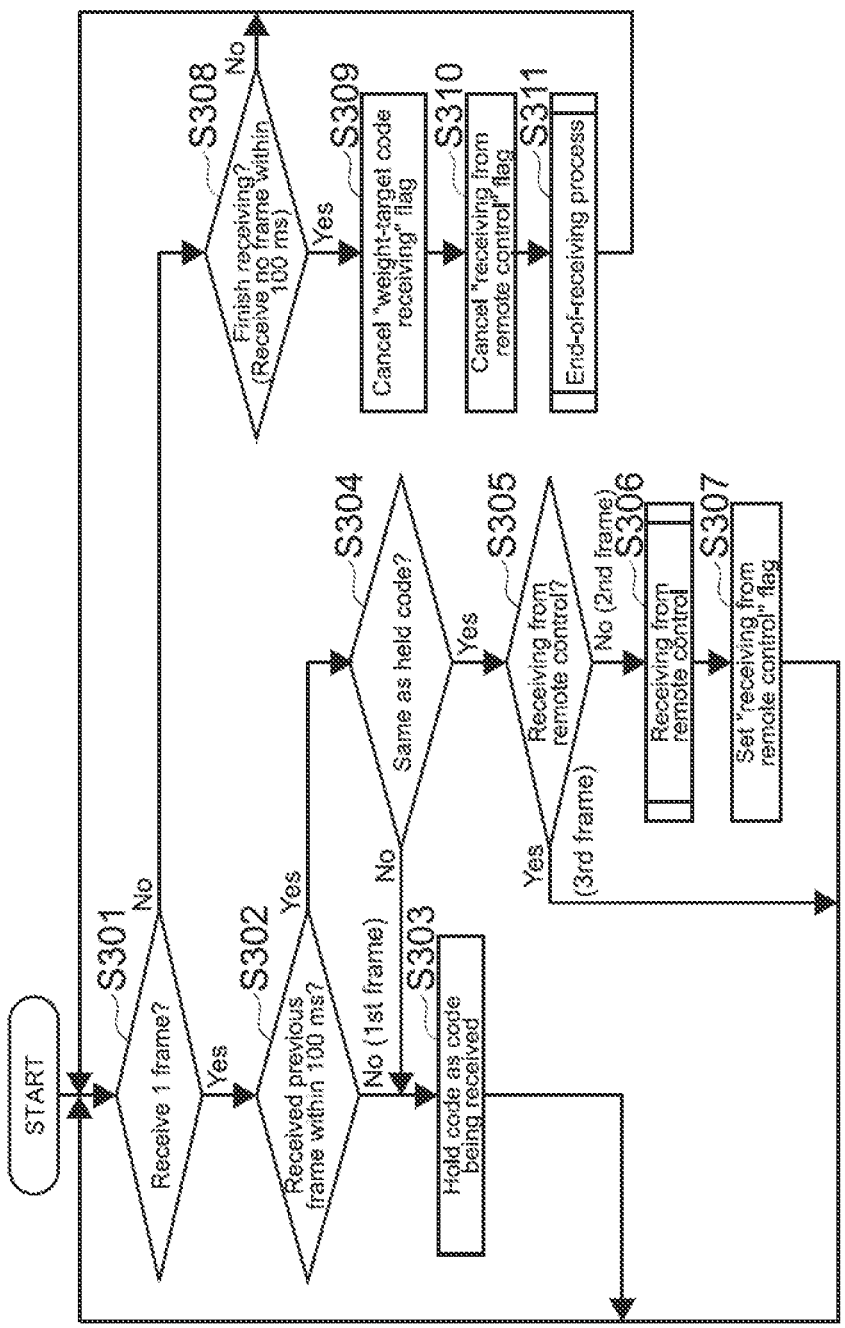
FIG. 7 is a flowchart showing a flow (general process) in a case where an operation-target apparatus receives a frame.

FIG. 7 is a process flow showing how the main body side of the operation-target apparatus 100 receives and processes the frame J sent from the remote control 10. Specifically, FIG. 7 shows general processes excluding processes of the weight frame W.

First, the main controller 101 receives one frame by means of the light receiver 70. (S301)

Here, "to receive one frame" means not only to merely receive one frame, but also to determine if the frame is in conformity with SIRCS definition (for example, to determine if predetermined number of 0 bits and predetermined number of 1 bits are received after receiving start bit), and to determine if the "category" in the code in relation to the operation-target apparatus 100 itself.

If one frame is not received, the main controller 101 proceeds to the process of S308. If one frame is received, the main controller 101 proceeds to the process of S302.

If it is determined that one frame is received in S301, next, the main controller 101 determines if the main controller 101 received the previous frame within 100 ms before receiving the latest frame. (S302)

Here, the time period 100 ms is employed because a cancel timer counts to 100 ms. If the main controller 101 receives the latest frame after more than 100 ms after receiving the previous frame, it means that those frames are not continuously received. If it is determined that those frames are not continuously received, the main controller 101 determines that the latest received frame is the first frame of a newly received code, and proceeds to the process of S303. Alternatively, if it is determined that those frames are continuously received, i.e., if it is determined that the latest frame is the second frame or a later frame, the main controller 101 proceeds to the process of S304.

If it is determined that those frames are not continuously received in S302, i.e., if it is determined that the latest frame is the first frame, the main controller 101 holds the code in the latest received frame as the code being received, and returns to the start process. (S303)

This process is the former process of the processes in SIRCS for ensuring twice matching of frames.

If it is determined that those frames are continuously received in S302, i.e., if it is determined that the latest frame is the second frame or a later frame, the main controller 101 compares the latest received code with the code held by the main controller 101. (S304)

This process is the latter process of the processes in SIRCS for ensuring twice matching of frames. If the received code matches the held code, the main controller 101 determines that the twice-matching condition is satisfied, and proceeds to the process of S305. If the received code does not match the held code, the main controller 101 proceeds to the process of S303.

If the latest received code matches the held code in S304, next, the main controller 101 determines if a "receiving from remote control" flag is set. (S305)

The "receiving from remote control" flag is set after the stored code is processed after receiving the second frame. The "receiving from remote control" flag is set in order to skip process of the stored code when the third frame or a later frame is received.

If the "receiving from remote control" flag is set, the main controller 101 determines that the latest frame is the third frame or a later frame. The main controller 101 returns to the start process without executing any process. If the "receiving from remote control" flag is not set, the main controller 101 proceeds to the process of S306.

If it is determined that the "receiving from remote control" flag is not set in S305, next, the main controller 101 executes the process corresponding to the received code. (S306)

Next, the main controller 101 sets the "receiving from remote control" flag, and returns to the start process. (S307)

The "receiving from remote control" flag is set in a case where the main controller 101 receives the frames from the remote control 10 smoothly, where the main controller 101 continuously receives the same code twice, and where the twice-matching condition is satisfied. The "receiving from remote control" flag is set in a case where the main controller 101 receives the second frame including the same code.

If it is determined that the main controller 101 does not receive one frame in S301, next, the main controller 101 determines if the main controller 101 received a series of frames. (S308)

The main controller 101 determines if the main controller 101 receives a frame within 100 ms before the present time to thereby determine if the main controller 101 received a series of frames. If the main controller 101 receives a frame within 100 ms, the main controller 101 determines that a series of frames is being sent, and returns to the start process. If the main controller 101 does not receive a frame within 100 ms, the main controller 101 determines that a series of frames is received, and proceeds to the process of S309.

If it is determined that a series of frames is received in S308, next, the main controller 101 clears (cancels) a "weight-target code receiving" flag. (S309)

Note that the flowchart of FIG. 7 does not show a process of setting the "weight-target code receiving" flag. However, the main controller 101 clears the "weight-target code receiving" flag just in case as part of an end-of-receiving process.

Next, the main controller 101 clears (cancels) the "receiving from remote control" flag. (S310)

Next, the main controller 101 executes an end-of-receiving process of a series of frames, and returns to the start process. (S311)

[Flow of Receiving Process Executed by Operation-Target Apparatus 100 (Example of Weight-Frame Process)]

Figure 8:
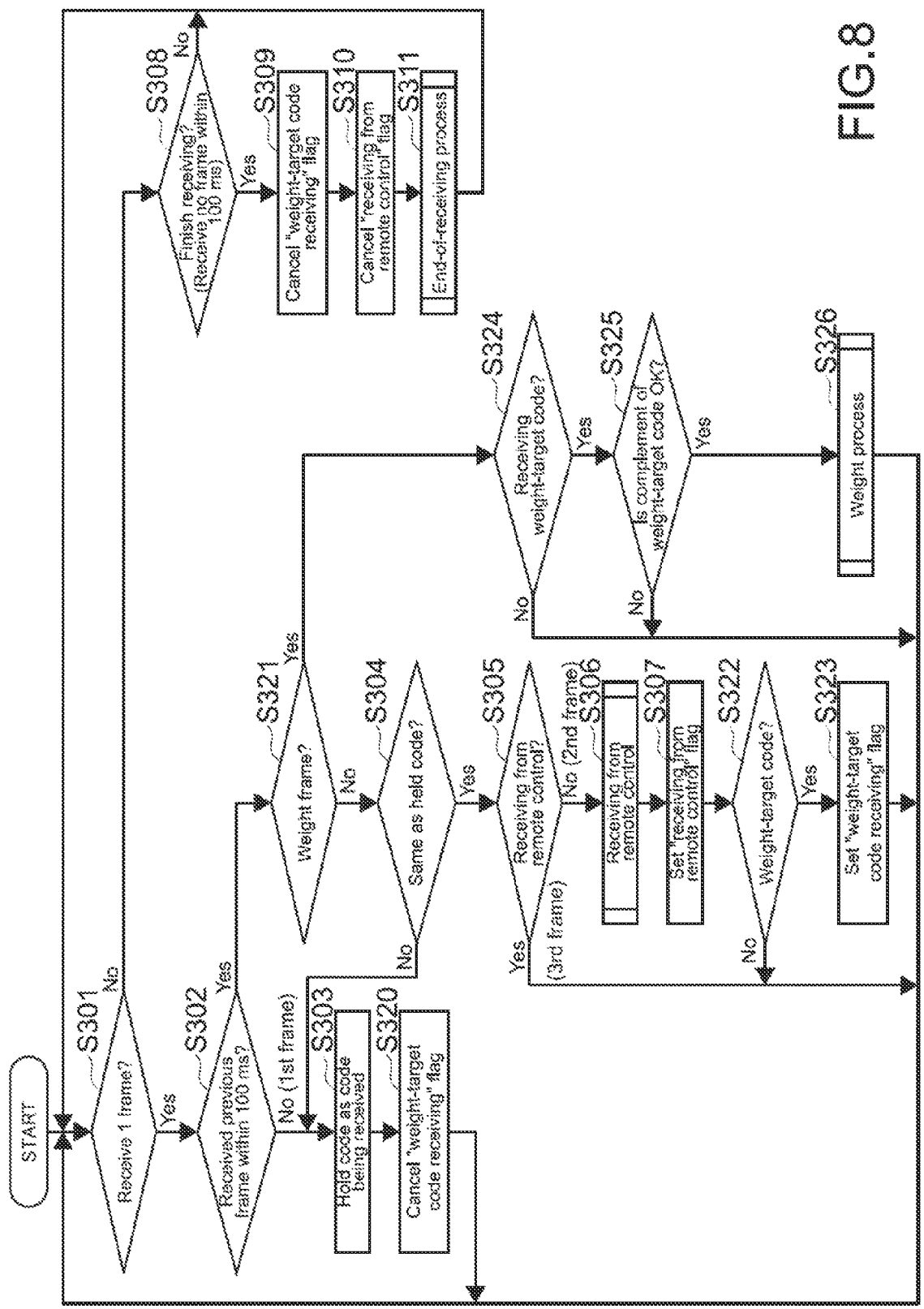
FIG. 8 is a flowchart showing a flow (weight-frame process) in a case where the operation-target apparatus receives a frame.

FIG. 8 is a process flow showing how the main body side of the operation-target apparatus 100 receives and processes a frame sent from the remote control 10. Specifically, FIG. 8 shows a flow in which a process in relation to a weight-frame is added to the flow of FIG. 7. Note that part similar to the above-mentioned general-process flow will be described simply.

First, the main controller 101 receives one frame from the light receiver 70. (S301)

If it is determined that the main controller 101 receives one frame in S301, next, the main controller 101 determines if the main controller 101 received the previous frame within 100 ms before receiving the latest frame. (S302)

If it is determined that those frames are not continuously received in S302, i.e., if it is determined that the latest frame is the first frame, the main controller 101 holds the code in the latest received frame as the code being received, and returns to the start process. (S303)

Next, the main controller 101 clears (cancels) the "weight-target code receiving" flag, and then returns to the start process. (S320)

The "weight-target code receiving" flag is set in the process of S323 (described later). The "weight-target code receiving" flag is set when a code, which may be modified by a weight frame, is being received.

If it is determined that those frames are continuously received in S302, i.e., if it is determined that the latest frame is the second frame or a later frame, next, the main controller 101 determines if the latest received frame is the weight frame W. (S321)

If it is determined that the latest received frame is not the weight frame W, the main controller 101 receives the second general frame J and the third general frame J in S304. If it is determined that the latest received frame is the weight frame W, the main controller 101 processes the weight frame W in S324.

If it is determined that the latest received frame is not the weight frame W in S321, next, the main controller 101 compares the latest received code with the held code. (S304)

If the latest received code matches the held code in S304, next, the main controller 101 determines if a "receiving from remote control" flag is set. (S305)

If it is determined that the "receiving from remote control" flag is not set in S305, next, the main controller 101 executes the process corresponding to the received code. (S306)

Next, the main controller 101 sets the "receiving from remote control" flag. (S307)

Next, the main controller 101 determines if the latest received code is a weight-target code. (S322)

The weight-target code indicates that the weight frame W may be added. Examples of the weight-target code include a code indicating press of up/down/right/left cursor keys, and a code indicating rotation of a jog dial. It is necessary to previously determine which codes are the weight-target codes. If the latest received code is not a weight-target code, the main controller 101 returns to the start process. If the latest received code is a weight-target code, the main controller 101 proceeds to the process of S323.

If it is determined that the latest received code is the weight-target code in S322, next, the main controller 101 sets the "weight-target code receiving" flag. After that, the main controller 101 returns to the start process. (S323)

If it is determined that the latest received frame is the weight frame W in S321, next, the main controller 101 determines if the "weight-target code receiving" flag is set. (S324)

The weight frame W modifies the weight-target code. So there is much point in receiving the weight frame W after receiving the weight-target code. In view of this, it is determined if the latest received frame is the weight frame W in S321. In a case where the "weight-target code receiving" flag is not set, the latest received code is not the weight-target code. So there is not much point in processing the latest received weight frame W. So the main controller 101 does not process the weight frame W, and returns to the start process. In a case where the "weight-target code receiving" flag is set, the main controller 101 proceeds to the process of S325, and processes the weight frame W.

If it is determined that the "weight-target code receiving" flag is set in S324, next, the main controller 101 determines if there is consistency between 4 bits of data in the weight frame W and complement 4 bits of data. (S325)

If there is no consistency, it is considered that an error occurs in data of the weight frame W. So the main controller 101 does not process the weight frame W, and returns to the start process. If there is consistency, the main controller 101 proceeds to the process of S326.

If it is determined that there is consistency between the data of the weight frame W and the complement of data in S325, next, the main controller 101 performs a process corresponding to the received weight-target code and to the data in the weight frame W. After that, the main controller 101 returns to the start process. (S326)

If it is determined that one frame is not received in S301, next, the main controller 101 determines if the main controller 101 received a series of frames. (S308)

If it is determined that a series of frames is received in S308, next, the main controller 101 clears (cancels) the "weight-target code receiving" flag. (S309)

Next, the main controller 101 clears (cancels) the "receiving from remote control" flag. (S310)

Next, the main controller 101 executes the end-of-receiving process of a series of frames, and returns to the start process. (S311)

[Flow of Receiving Process Executed by Operation-Target Apparatus 100 (with Weight-Value Relative-Change Process)]

Figure 9:
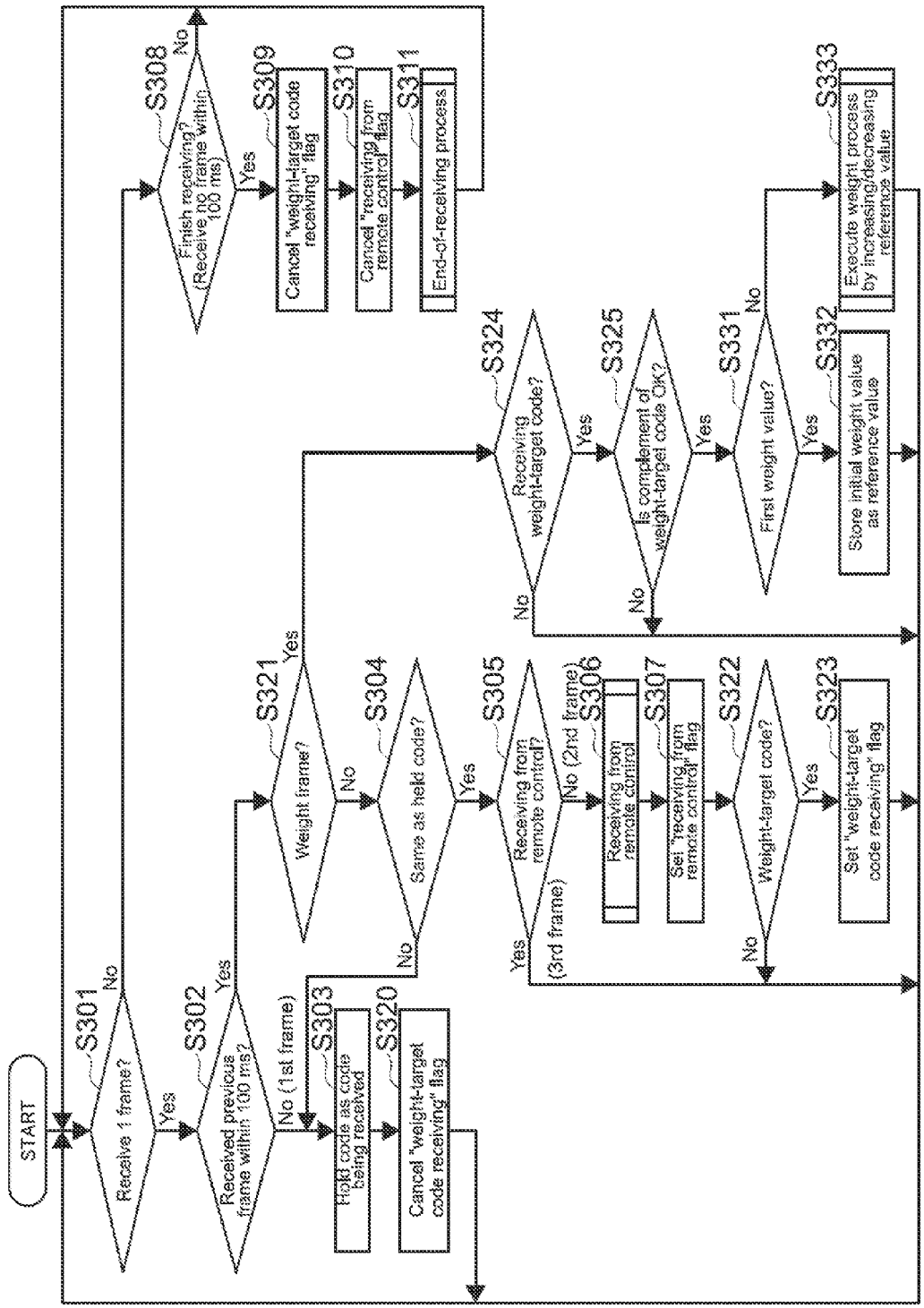
FIG. 9 is a flowchart showing a flow (to process analog value of weight frame as relative value) in a case where the operation-target apparatus receives a frame.

FIG. 9 is a process flow showing how the main body side of the operation-target apparatus 100 receives and processes a frame sent from the remote control 10. Specifically, FIG. 9 shows a flow in which a weight-frame process is added to the flow of FIG. 8. The weight-frame process is to process a relative change of a weight value. Note that, hereinafter, part similar to the above-mentioned process of a weight frame without a process of a relative change of a weight value will not be described.

If it is determined that there is consistency between the data of the weight frame W and the complement of data in S325, next, the main controller 101 determines if data in the received weight frame W is the first weight value data. (S331)

The main controller 101 may determine if data in the received weight frame W is the first weight value data by determining if a reference value is stored. Alternatively, the main controller 101 may determine if data in the received weight frame W is the first weight value data by determining if a flag is set. Alternatively, the main controller 101 may determine if data in the received weight frame W is the first weight value data by means of a timer. Note that, according to each of those configurations, it is necessary to clear the reference value, the flag, or the timer after processing the weight value data. If it is determined that data in the received weight frame W is the first weight value data, the main controller 101 proceeds to the process of S332. If it is determined that data in the received weight frame W is not the first weight value data, the main controller 101 proceeds to the process of S333.

If it is determined that data in the received weight frame W is the first weight value data in S331, next, the main controller 101 stores weight value data in the weight frame W as an initial weight value, i.e., "reference value". After that, the main controller 101 returns to the start process. (S332)

If it is determined that data in the received weight frame W is not the first weight value data in S331, next, the main controller 101 obtains difference between the latest received weight value data and the "reference value" (relativizing). The main controller 101 executes a weight process by increasing/decreasing the "reference value". After that, the main controller 101 returns to the start process. (S333)

INDUSTRIAL APPLICABILITY

The weight frame W may be applied to a remote control. The remote control includes cursor keys, specifically, variable-speed cursor keys. The scrolling speed is variable based on pressure applied to four-direction cursor keys, i.e., up/down/right/left cursor keys. A device capable of detecting pressure applied to a cursor key as an analog value (Q-point (registered trademark) manufactured by Shin-Etsu Polymer Co., Ltd., etc.) is used for the cursor keys. When a user taps a cursor key, a usual one-step operation is performed. When a user holds down a cursor key, an about 16-level variable-speed scrolling is executed depending on pressure levels.

General cursor codes are used for codes corresponding to keys. The weight frame W including pressure data is inserted next to the frames J each including a general cursor code, and the frames are sent. In a case where the remote control sends a signal to an existing apparatus, which does not support the weight frame W, constant-rate scrolling is performed as usual. (Weight frame W is abandoned as noise.)

Note that it is necessary for the receiving side to correct SIRCS receiving algorithm in order to receive and use the weight frame W.

Further, for the weight frame W may be applied to keys for operating an apparatus. When a user holds down keys, the apparatus is controlled to execute variable-speed FF (fast forward)/REW (rewind) and the like.

[Other Configurations of the Present Technology]

Note that, the present technology may employ the following configurations.

(1) A remote control device, comprising:
an operation section configured
to receive input of an instruction from a user, and
to receive input of an analog value with respect to the instruction;
a converting section configured
to convert the instruction input in the operation section into a bit string for infrared communication, and
to convert the analog value input in the operation section into a bit string for infrared communication; and
an infrared-communication section configured to send an infrared signal based on the converted bit strings.

(2) The remote control device according to (1), wherein
the converting section is configured
to convert the instruction into a bit string having a first bit length, and
to convert the analog value into a bit string having a second bit length, the second bit length being different from the first bit length.

(3) The remote control device according to (1) or (2), wherein
the bit string having the second bit length includes a first bit string and a second bit string, the first bit string indicating the analog value, the second bit string being a complement of the first bit string.

(4) The remote control device according to any one of (1) to (3), wherein
the bit strings for infrared communication include a plurality of bit strings and at least one subsequent bit string, the plurality of bit strings each having the first bit length, the at least one subsequent bit string having the second bit length.

(5) The remote control device according to any one of (1) to (4), further comprising
a controller section configured to determine, in a case where it is determined that a key is being pressed, if the key is a pressure sensitive key.

(6) An information processing apparatus, comprising:
an infrared receiving section configured to receive an infrared signal sent from a remote control device, the remote control device including an operation section configured to receive input of an instruction from a user, and to receive input of an analog value with respect to the instruction, the remote control device being configured to convert the instruction input in the operation section into a bit string for infrared communication, and the analog value input in the operation section into a bit string for infrared communication, the remote control device being configured to send an infrared signal based on the converted bit strings; and
a controller section configured
to decode the received infrared signal to obtain the bit strings,
to determine the instruction input by the user and the analog value, and
to execute the instruction based on the analog value.

(7) An information processing system, comprising:
a remote control device including
an operation section configured
to receive input of an instruction from a user, and
to receive input of an analog value with respect to the instruction,
a converting section configured
to convert the instruction input in the operation section into a bit string for infrared communication, and
to convert the analog value input in the operation section into a bit string for infrared communication, and
an infrared-communication section configured to send an infrared signal based on the converted bit strings; and
an information processing apparatus including
an infrared receiving section configured to receive an infrared signal sent from the remote control device, and
a controller section configured
to decode the received infrared signal to obtain the bit strings,
to determine the instruction input by the user and the analog value, and
to execute the instruction based on the analog value.

(8) A remote control method, comprising:
receiving, by an operation section, input of an instruction from a user and input of an analog value with respect to the instruction;
converting, by a converting section, the instruction input in the operation section into a bit string for infrared communication, and the analog value input in the operation section into a bit string for infrared communication; and
sending, by an infrared-communication section, an infrared signal based on the converted bit string.

It should be understood by those skilled in the art that various modifications, combinations, sub-combinations and alterations may occur depending on design requirements and other factors insofar as they are within the scope of the appended claims or the equivalents thereof.

What is claimed is:

1. A remote control device, comprising:
an operation section configured
to receive input of an instruction from a user, and
to receive input of an analog value with respect to the instruction, the analog value being representative of a weight of the instruction;
a controller configured
to convert the instruction input in the operation section into an instruction bit string for infrared communication,
to convert the analog value input in the operation section into an analog value bit string for infrared communication, and
to perform a predetermined determination; and
an infrared-communication section configured to send an infrared signal,
in which the infrared signal includes a predetermined plurality of instruction frames each representative of the instruction bit string and, depending upon a result of the predetermined determination, a weight frame representative of the analog value bit string, and
in which the predetermined determination includes determining whether the instruction is still being input and whether the instruction frames have been sent the predetermined plurality of times and, only when a result thereof indicates that the instruction is still being input and the instruction frames have been sent the predetermined plurality of times, the infrared signal includes the weight frame arranged after the predetermined plurality of instruction frames.

2. The remote control device according to claim 1, wherein
the instruction bit string has a first bit length, and
the analog value bit string has a second bit length, the second bit length being different from the first bit length.

3. The remote control device according to claim 2, wherein the analog value bit string having the second bit length includes a first bit string and a second bit string, the first bit string indicating the analog value, the second bit string being a complement of the first bit string.

4. An information processing apparatus, comprising:

an infrared receiving section configured to receive an infrared signal sent from a remote control device, the remote control device including an operation section configured to receive input of an instruction from a user, and to receive input of an analog value with respect to the instruction, the analog value being representative of a weight of the instruction, the remote control device being configured to convert the instruction input in the operation section into an instruction bit string for infrared communication, and the analog value input in the operation section into an analog value bit string for infrared communication, and to perform a predetermined determination, and the remote control device being configured to send an infrared signal; and a controller section configured
to decode the received infrared signal to obtain the bit strings,
to determine the instruction input by the user and the analog value, and
to execute the instruction based on the analog value, in which the infrared signal includes a predetermined plurality of instruction frames each representative of the instruction bit string and, depending upon a result of the predetermined determination, a weight frame representative of the analog value bit string, and in which the predetermined determination includes determining whether the instruction is still being input and whether the instruction frames have been sent the predetermined plurality of times and, only when a result thereof indicates that the instruction is still being input and the instruction frames have been sent the predetermined plurality of times, the infrared signal includes the weight frame arranged after the predetermined plurality of instruction frames.

5. An information processing system, comprising:

a remote control device including
an operation section configured
to receive input of an instruction from a user, and
to receive input of an analog value with respect to the instruction, the analog value being representative of a weight of the instruction,
a control device configured
to convert the instruction input in the operation section into an instructions bit string for infrared communication,
to convert the analog value input in the operation section into an analog value bit string for infrared communication, and
to perform a predetermined determination, and
an infrared-communication section configured to send an infrared signal; and an information processing apparatus including
an infrared receiving section configured to receive an infrared signal sent from the remote control device, and
a controller section configured
to decode the received infrared signal to obtain the bit strings,
to determine the instruction input by the user and the analog value, and
to execute the instruction based on the analog value, in which the infrared signal includes a predetermined plurality of instruction frames each representative of the instruction bit string and, depending upon a result of the predetermined determination, a weight frame representative of the analog value bit string, and in which the predetermined determination includes determining whether the instruction is still being input and whether the instruction frames have been sent the predetermined plurality of times and, only when a result thereof indicates that the instruction is still being input and the instruction frames have been sent the predetermined plurality of times, the infrared signal includes the weight frame arranged after the predetermined plurality of instruction frames.

6. A remote control method, comprising:

receiving, by an operation section, input of an instruction from a user and input of an analog value with respect to the instruction, the analog value being representative of a weight of the instruction;

converting, by a converting section, the instruction input in the operation section into an instruction bit string for infrared communication, and the analog value input in the operation section into an analog value bit string for infrared communication;

performing a predetermined determination; and sending, by an infrared-communication section, an infrared signal, in which the infrared signal includes a predetermined plurality of instruction frames each representative of the instruction bit string and, depending upon a result of the predetermined determination, a weight frame representative of the analog value bit string, and in which the predetermined determination includes determining whether the instruction is still being input and whether the instruction frames have been sent the predetermined plurality of times and, only when a result thereof indicates that the instruction is still being input and the instruction frames have been sent the predetermined plurality of times, the infrared signal includes the weight frame arranged after the predetermined plurality of instruction frames.

* * * * *